US009380518B2

(12) United States Patent
Jung et al.

(10) Patent No.: US 9,380,518 B2
(45) Date of Patent: Jun. 28, 2016

(54) METHOD AND APPARATUS FOR MANAGING DEVICE DISCOVERY IN WIRELESS SYSTEM

(71) Applicant: Samsung Electronics Co. Ltd., Suwon-si, Gyeonggi-do (KR)

(72) Inventors: Bu-Seop Jung, Suwon-si (KR); Jung-Hun Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 166 days.

(21) Appl. No.: 13/691,098

(22) Filed: Nov. 30, 2012

(65) Prior Publication Data

US 2013/0148545 A1  Jun. 13, 2013

(30) Foreign Application Priority Data

Dec. 13, 2011  (KR) .................. 10-2011-0133667

(51) Int. Cl.
| | |
|---|---|
| *H04W 48/16* | (2009.01) |
| *H04W 52/02* | (2009.01) |
| *H04W 8/00* | (2009.01) |
| *H04W 4/00* | (2009.01) |
| *H04W 76/02* | (2009.01) |
| *H04W 84/18* | (2009.01) |

(52) U.S. Cl.
CPC .............. *H04W 48/16* (2013.01); *H04W 8/005* (2013.01); *H04W 52/0251* (2013.01); *H04W 4/008* (2013.01); *H04W 76/023* (2013.01); *H04W 84/18* (2013.01)

(58) Field of Classification Search
CPC . H04W 48/16; H04W 52/0251; H04W 84/12; H04W 8/005; H04W 76/02; H04W 76/021; H04W 76/023; H04L 67/104; Y02B 60/50
USPC .................................. 370/254, 255; 709/248
See application file for complete search history.

(56) References Cited

U.S. PATENT DOCUMENTS

| | | | |
|---|---|---|---|
| 8,428,079 B1* | 4/2013 | Lambert et al. ............... 370/461 |
| 8,929,822 B2* | 1/2015 | Jung et al. .................... 455/41.2 |
| 9,223,522 B2* | 12/2015 | Nagasaki ............. H04W 8/005 |
| 2006/0239208 A1 | 10/2006 | Roberts et al. |
| 2007/0171910 A1 | 7/2007 | Kumar |

(Continued)

FOREIGN PATENT DOCUMENTS

| | | |
|---|---|---|
| CN | 101352073 A | 1/2009 |
| CN | 101371603 A | 2/2009 |

(Continued)

OTHER PUBLICATIONS

Wi-Fi Alliance: "Wi-Fi Peer-to-Peer (P2P) Specification v1.1", Wi-Fi Alliance Specification, Jan. 1, 2010, pp. 1-159, XP009163866.

*Primary Examiner* — Ahmed Elallam
(74) *Attorney, Agent, or Firm* — Jefferson IP Law, LLP (57) ABSTRACT

A method and apparatus for managing device discovery in a wireless system are provided. The method includes performing a periodic search operation to discover a peer device, stopping the periodic search operation upon discovering a suitable peer device, and switching to a periodic listening operation for allowing the Wireless Fidelity (WiFi) Peer-To-Peer (P2P) device to be discovered by the discovered peer device and for permitting a connection with the discovered peer device.

18 Claims, 9 Drawing Sheets

(56) References Cited

U.S. PATENT DOCUMENTS

| | | |
|---|---|---|
| 2008/0031193 A1 | 2/2008 | Laroia et al. |
| 2010/0128701 A1 | 5/2010 | Nagaraja |
| 2010/0271959 A1* | 10/2010 | Qi et al. .......... 370/248 |
| 2011/0034127 A1* | 2/2011 | Wentink et al. .......... 455/41.2 |
| 2011/0153818 A1* | 6/2011 | Vandwalle et al. .......... 709/224 |
| 2011/0161697 A1 | 6/2011 | Qi et al. |
| 2011/0282989 A1* | 11/2011 | Geirhofer et al. .......... 709/224 |
| 2012/0106381 A1* | 5/2012 | Vedantham et al. .......... 370/252 |
| 2012/0166671 A1* | 6/2012 | Qi et al. .......... 709/236 |
| 2014/0022946 A1 | 1/2014 | Sampath |

FOREIGN PATENT DOCUMENTS

| | | |
|---|---|---|
| CN | 102111859 A | 6/2011 |
| JP | 2006183289 A | 7/2006 |
| WO | 2007050676 A1 | 5/2007 |

* cited by examiner

METHOD AND APPARATUS FOR MANAGING DEVICE DISCOVERY IN WIRELESS SYSTEM

PRIORITY

This application claims priority under 35 U.S.C. §119(a) to a Korean patent application filed in the Korean Intellectual Property Office on Dec. 13, 2011 and assigned Serial No. 10-2011-0133667, the entire disclosure of which is herein incorporated by reference.

BACKGROUND OF THE INVENTION

1. Field of the Invention

The present invention relates to device discovery in a wireless system. More particularly, the present invention relates to a method and apparatus for managing device discovery in a wireless system.

2. Description of the Related Art

In recent years, mobile devices supporting Wireless Fidelity (WiFi) direct or WiFi Peer-To-Peer (P2P) are becoming more widely distributed and used. The WiFi direct is a communication standard for transmitting data between devices through WiFi communication systems. However, until now, Bluetooth and Digital Living Network Alliance (DLNA) systems have been primarily used for data sharing between devices. However, WiFi may enable wireless data exchange at a wider transmission range and faster speed than Bluetooth and DLNA systems.

Data transmission using WiFi direct does not require an Access Point (AP). WiFi direct connects devices directly without a separate AP. Accordingly, there is no need to access a WiFi zone or network. Furthermore, WiFi direct may connect devices on a point-to-point basis or on a point-to-multipoint basis, which may be referred to as a P2P group.

Figure 1:
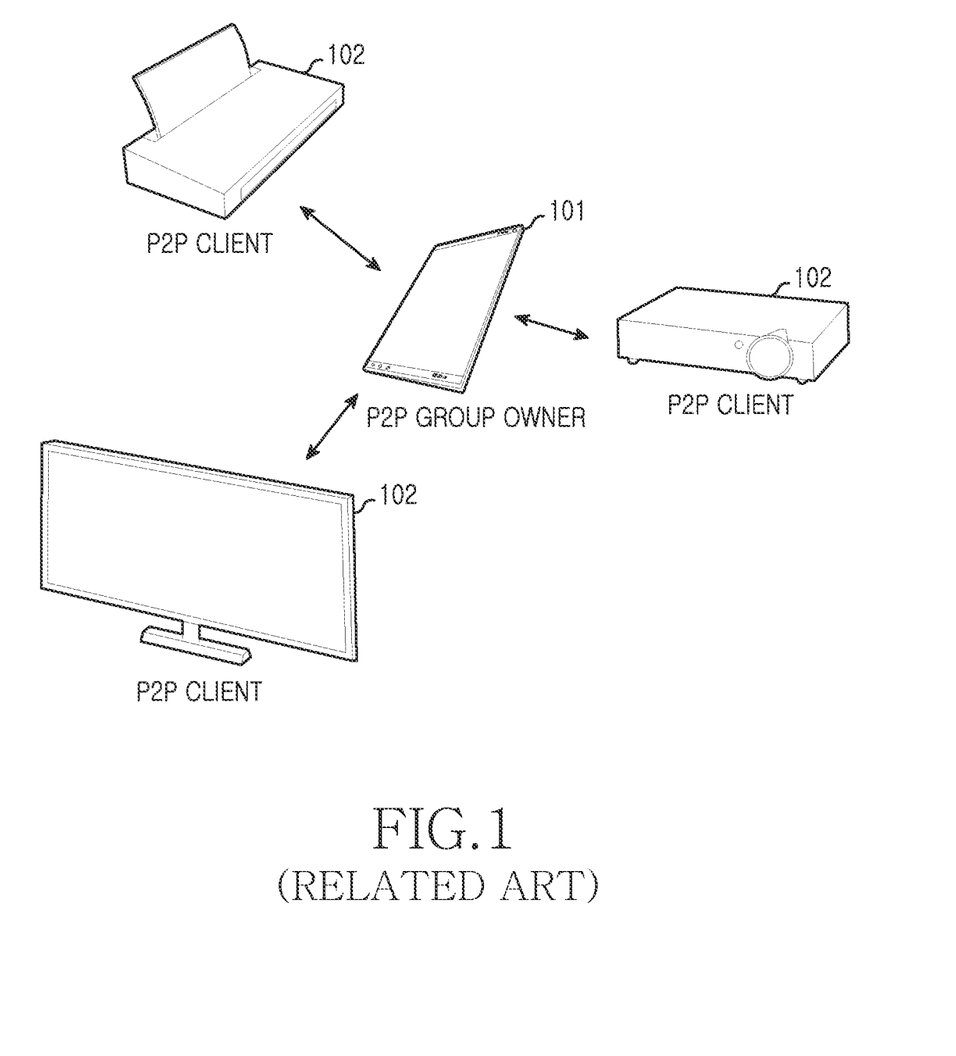
FIG. 1 is a diagram depicting a Peer-To-Peer (P2P) group that includes devices connected by Wireless Fidelity (WiFi) P2P according to the related art.
Figure 2:
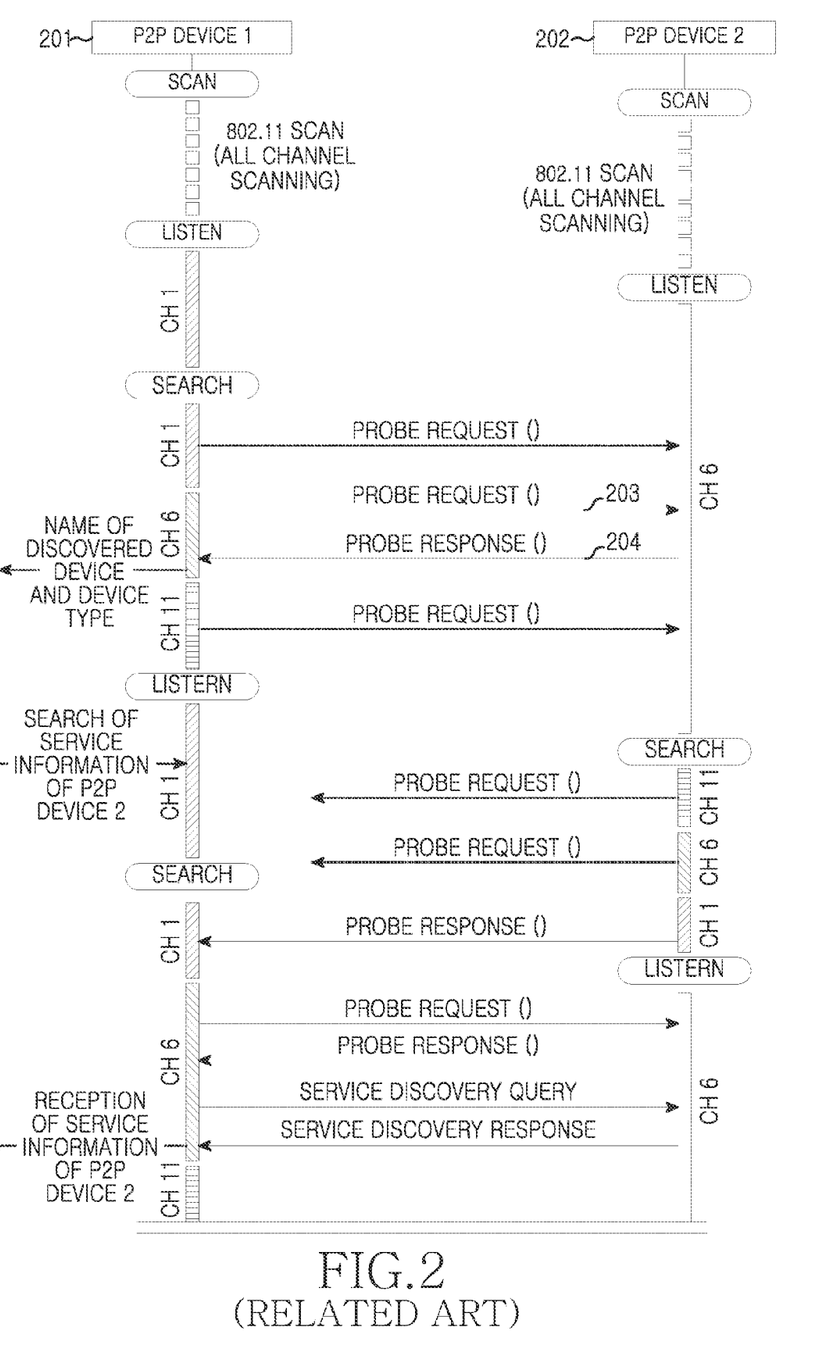
FIG. 2 is a communication flow diagram of general device discovery between devices according to according to the related art.

FIG. 1 depicts a P2P group that includes devices connected by WiFi P2P according to the related art. FIG. 2 is a communication flow diagram of general device discovery between devices according to the related art.

Referring to FIGS. 1 and 2, one device becomes a P2P group owner 101, and the remaining devices become P2P clients 102. The connection between devices illustrated in FIG. 1 precedes a process of detecting an existence of a peer device, which may also be referred to as a process of device discovery. A WiFi P2P device scans all channels through a scan method based on the Institute of Electrical and Electronics Engineers 802.11 network standard and finds a previously created group owner. When failing to discover the group owner from the scanning of all channels, the WiFi P2P device repeats the process of listening and searching, in which the WiFi P2P device is respectively in a listening state and a searching state. However, the process of listening and searching are repeated limitlessly, and the device discovery may end after a predetermined amount of time.

Similar to a process in which a WiFi P2P device detects the existence of an AP in an existing 802.11 network, a basic method in which a WiFi P2P device detects the existence of a peer device for WiFi P2P device discovery includes an exchange of a probe request message and a probe response message according to the IEEE 802.11 Media Access Control (MAC) protocol.

The WiFi P2P device sends the probe request message to a peer device and receives the probe response message from the peer device, thereby detecting the existence of the peer device. Also, the WiFi P2P device should permit being, i.e., be enabled to be, discovered by the peer device in response to a probe request message transmitted from the peer device. This being enabled to be discovered may be referred to as the listening state. The listening refers to a duration of time, or time interval, in which the WiFi P2P device enables its Reception (RX) part and monitors for a probe request message of the peer device. The searching refers to a duration of time, or time interval, in which the WiFi P2P device may send a probe request message to the peer device and receive a probe response message from the peer device. The WiFi P2P device, which is not a P2P group owner, performs the listening through one fixed channel from among channels 1, 6, and 11 of the IEEE 802.11 standard and performs the search through the channels 1, 6, and 11. As a result, two WiFi P2P devices may both repeatedly perform the searching and the listening and may simultaneously discover each other.

Furthermore, the WiFi P2P device may further perform service discovery through the searching. The service discovery includes a message exchange that is used for determining service information, such as a service protocol type of a peer device and the like. Although two WiFi P2P devices connect with each other, the connection of the two WiFi P2P devices is useless if their supporting service information are different from each other. For example, in a case where a first WiFi P2P device uses a Universal Plug and Play (UPnP) based file sharing scheme, while a second WiFi P2P device uses a Web service based file sharing scheme, file sharing between the two devices may be difficult.

According to the communication flow diagram of FIG. 2, the first WiFi P2P device 201 that is searching sends a probe request message to the second WiFi P2P device 202 through channel 6 at step 203, and the second WiFi P2P device 202 that is listening sends a probe response message to the first WiFi P2P device 201 through channel 6 at step 204. Through this message exchange, the first WiFi P2P device 201 detects the existence of the second WiFi P2P device 202. Furthermore, the first WiFi P2P device 201, being the searching device, and the second WiFi P2P device 202, being the listening device, may exchange service information through channel 6. Accordingly, a WiFi P2P device may detect information about a MAC address of a peer device, a network name (i.e., a Service Set IDentifier (SSID)), a device name, a device type, a service protocol, a service type, and other similar and suitable information.

Figure 3:
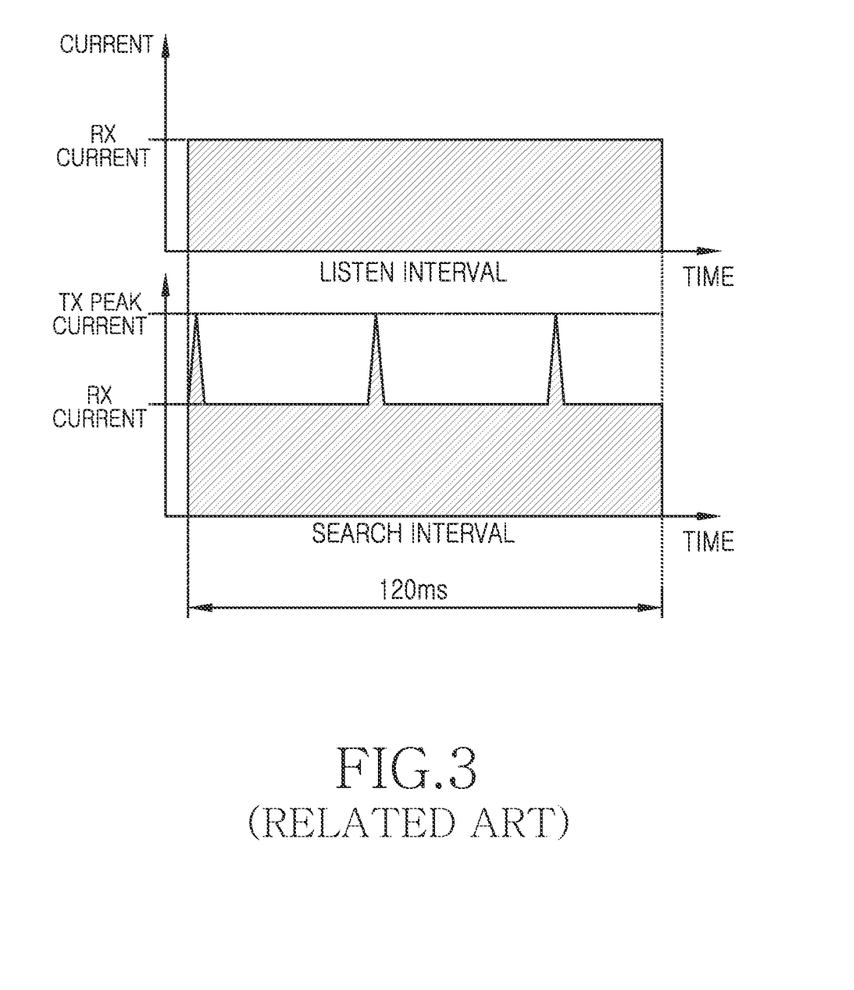
FIG. 3 is a diagram illustrating a comparison of current consumption patterns between listen and search according to according to the related art.

FIG. 3 is a diagram illustrating a comparison of current consumption patterns of listening and searching according to the related art.

Referring to FIG. 3, the searching uses a time interval corresponding to a generating of a Transmission (TX) peak current for sending probe request messages to a peer device respectively on channels 1, 6, and 11, and uses a time interval for maintaining Reception (RX) current for receiving a probe response message from the peer device. Also, the listening uses the time interval for maintaining the RX current for receiving a probe request message from the peer device. Because the TX peak current corresponding to the sending of the probe request message is generated spontaneously, there is almost no difference of a consumption current between the listening state and the searching state, when executed during a same time interval. That is, the difference of the consumption current between the listening state and the searching state, during the same time interval, is proportional to a difference of the consumption current for respective durations of time allotted to the listening process and the searching process.

Although not searching for a specific peer device through the searching state, the WiFi P2P device may conduct only the listening state so that the peer device may be able to find itself. For example, when the peer device wants a connection, it is desirable that the WiFi P2P device, such as a printer having a WiFi function, a Television (TV), a facsimile, a speaker, and any other similar device, maintains a state of being discoverable by the peer device by maintaining only in order to increase a user's convenience. That is, in a situation in which the peer device may not know when to begin the device discovery process described with reference to FIG. 2, then it is reasonable that the WiFi P2P device maintains only the listening state and is in a state of being discoverable by the peer device.

However, the WiFi P2P device maintains only the listening state to indicate that the WiFi P2P device consumes the RX current continuously. Maintaining only the listening state in a situation in which the WiFi P2P device is not sure when the WiFi P2P device will receive a probe request message or a service discovery request from the peer device results in a waste of resources, such as battery life. That is, although the peer device does not perform a device discovery process, the WiFi P2P device maintains only the listening state, which is inefficient with respect to current consumption. However, the WiFi P2P device may execute a repeated periodic listening state and sleep state in order to decrease current consumption, but a probe message may be delayed in such a case because the WiFi P2P device may not respond to a probe request message of the peer device while in a sleep state. Also, a duration of listening and a period or time interval of listening may be shortened, but such goes against reducing the current consumption.

Therefore, a need exists for a system and method for performing a self diagnosis of a device without the inconvenience caused when manually selecting a self diagnosis item from a computer or a user interface.

SUMMARY OF THE INVENTION

Aspects of the present invention are to address at least the above-mentioned problems and/or disadvantages and to provide at least the advantages described below. Accordingly, an aspect of the present invention is to provide a device discovery management method and apparatus for, when discovering a peer device performing device discovery, stopping a search operation and converting to a listening operation, thereby reducing current consumption to address a drawback that a related-art scheme of maintaining only the listening operation in a situation of not having knowledge of when a peer device will begin device discovery is inefficient in current consumption.

Another aspect of the present invention is to provide a device discovery management method and apparatus for, when a suitable peer device is discovered through a search operation, converting to a listening operation, thereby being capable of reducing current consumption compared to maintaining only the listening operation.

The above aspects are addresses by providing a method and apparatus for managing device discovery in a wireless system.

In accordance with an aspect of the present invention, a method for managing device discovery in a wireless system is provided. The method includes performing a periodic search operation to discover a peer device, stopping the periodic search operation upon discovering a suitable peer device, and switching to a periodic listening operation for allowing the Wireless Fidelity (WiFi) Peer-To-Peer (P2P) device to be discovered by the discovered peer device and for permitting a connection with the discovered peer device.

In accordance with another aspect of the present invention, an apparatus for managing device discovery in a wireless system is provided. The apparatus includes a storage unit and a controller. The storage unit stores a program controlling operation of the controller and a variety of data that is input to or output from the controller when a control operation of the controller is performed. The controller performs WiFi direct connection with a peer device. When the WiFi direct connection is performed, the controller performs a periodic search operation to discover a suitable peer device and, upon discovering the suitable peer device, the controller stops the periodic search operation, and switches to a periodic listening operation for allowing the controller to be discovered by the discovered peer device and for permitting a connection with the discovered peer device.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are limited to the bibliographical meanings, but, are merely used by the inventor to enable a clear and consistent understanding of the present invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate to a method and apparatus for managing device discovery in a wireless system. More particularly, exemplary embodiments of the present invention relate to a device discovery management method and apparatus for reducing a consumption of current.

An exemplary embodiment of the present invention provides a device discovery management method and apparatus for, when a suitable peer device is discovered during a search state, converting into a listening state, thereby reducing a current consumption compared to a related art scheme of maintaining only a listening state. That is, the related art scheme of maintaining the listening state despite being in a situation of having no knowledge of when a peer device will begin a device discovery operation is inefficient and, to avoid such an inefficiency, a device discovery management method and apparatus according to the exemplary embodiments of the present invention may convert into a listening state when discovering a peer device that is executing a device discovery process.

Furthermore, an exemplary embodiment of the present invention provides a device discovery management method and apparatus for, when a suitable peer device is discovered during the searching state only, converting into the listening state and beginning the listening and, if there is a connection request within a preset time, maintaining the listening state and, otherwise, again converting into the searching state, thereby reducing current consumption.

Figure 4:
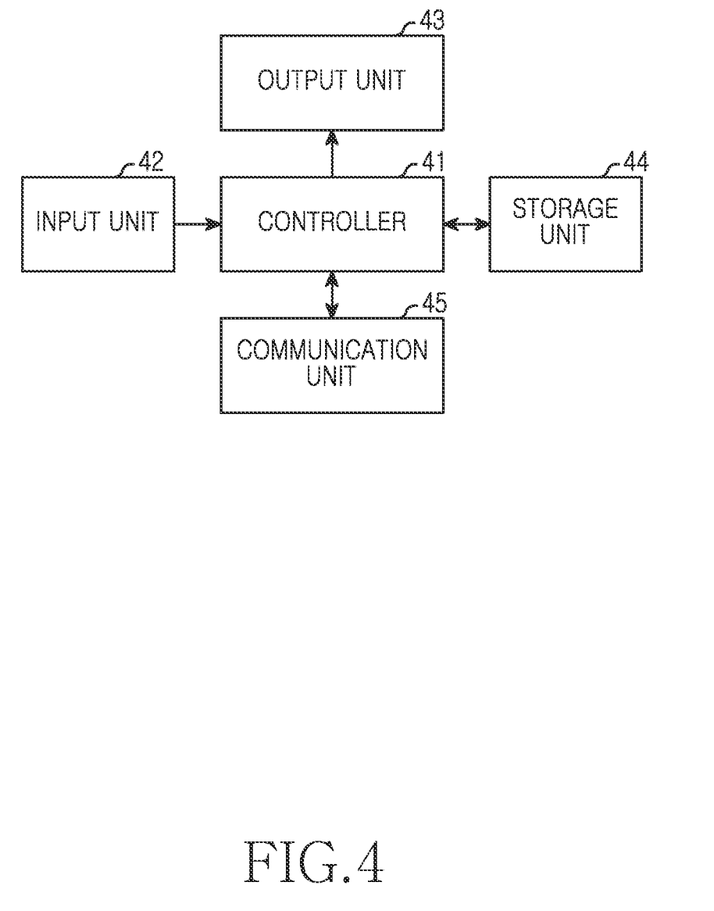
FIG. 4 is a block diagram illustrating a construction of a WiFi P2P device according to an exemplary embodiment of the present invention.

FIG. 4 is a block diagram illustrating a construction of a Wireless Fidelity (WiFi) Peer-To-Peer (P2P) device according to an exemplary embodiment of the present invention.

Referring to FIG. 4, the WiFi P2P device includes a controller 41, an input unit 42, an output unit 43, a storage unit 44, and a communication unit 45. The input unit 42 outputs an input signal to the controller 41. The output unit 43 outputs a video signal and a voice signal according to an output signal under the control of the controller 41. The storage unit 44 stores a program for controlling a general operation of the device and a variety of data that are input and/or output when a control operation of the device is performed. The communication unit 43 performs device discovery under the control of the controller 41, and may connect to a peer device using a WiFi direct connection.

The controller 41 controls a general operation of the device, and performs an operation corresponding to an input signal received from the input unit 42, with reference to the data of the storage unit 44. A method for reducing current consumption of the controller 41 at the time of the WiFi direct connection according to an exemplary embodiment of the present invention is described below.

Figure 5:
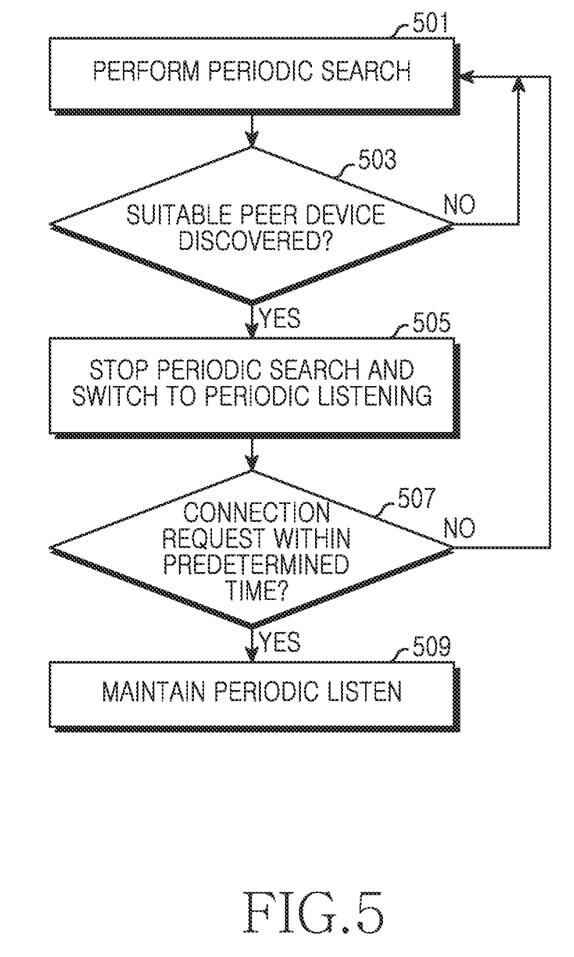
FIG. 5 is a flowchart illustrating a device discovery management procedure according to an exemplary embodiment of the present invention.
Figure 6:
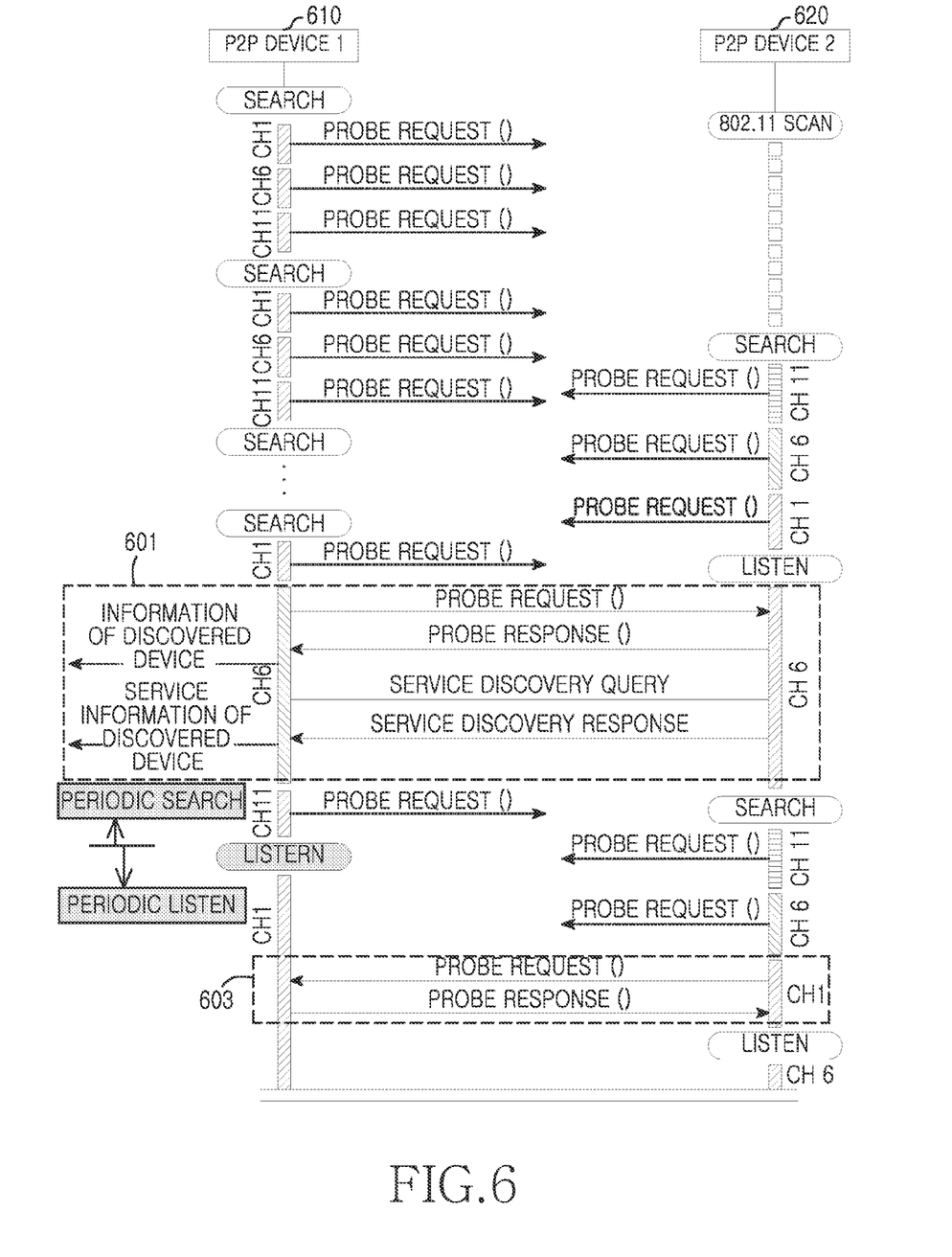
FIG. 6 is a communication flow diagram of device discovery between WiFi P2P devices according to an exemplary embodiment of the present invention.

FIG. 5 is a flowchart illustrating a device discovery management procedure according to an exemplary embodiment of the present invention. FIG. 6 is a communication flow diagram of device discovery between WiFi P2P devices according to an exemplary embodiment of the present invention.

Referring to FIGS. 5 and 6, in step 501, the controller 41 performs a periodic search operation, which includes repeatedly switching between a search state and a sleep state. A period of the search operation is the sum of a duration of the search state and a duration of the sleep state. The controller 41 may permit a user to set each of the durations of the search state and the sleep state. However, the present invention is not limited thereto, and the respective durations of the search state and the sleep state may be predetermined or set in any suitable manner. Through the search operation, the controller 41 sends a probe request message to a peer device that is listening for device discovery and receives a probe response message from the peer device, thereby discovering the peer device. In step 501, the controller 41 performs only the periodic search operation which is described below in detail.

As shown in FIG. 6, a first P2P device 610 performs a periodic search operation through channels 1, 6, and 11. Also, a second P2P device 620 repeatedly switches between a search state and listen state. In detail, the second P2P device 620 searches through channels 1, 6, and 11, and listens through channel 6. The first P2P device 610 sends a probe request message to the second P2P device 620 through channel 6 during the periodic search, and the second P2P device 620, being in a listening state, sends a probe response message to the first P2P device 610 through channel 6. Through this message exchange, the first P2P device 610 detects the existence of the second P2P device 620. Furthermore, the first P2P device 610 that is executing the periodic search operation may perform a service discovery operation through channel 6 and acquire service information of the second P2P device, which is in the listening state. As a result, through step 501, the controller 41 may acquire a variety of information, such as a Media Access Control (MAC) address of the second P2P device 620, a network name (i.e., a Service Set IDentifier (SSID)), a device name, a device type, a service protocol, a service type, and any other suitable and/or similar information, as indicated by reference numeral 601 of FIG. 6.

Next, if a suitable peer device is discovered in step 503, then the controller 41 stops the periodic search operation and switches to periodic listen operation. When first discovering a peer device, the controller 41 may stop the periodic search operation. Furthermore, the controller 41 may set a search condition and, when a peer device matching with the set search condition is discovered, may stop the periodic search operation. The controller 41 may permit a user to set the search condition. However, the present invention is not limited thereto, and the search condition may be predetermined or may be set according to any suitable and/or similar process. As aforementioned, through step 501, the controller 41 may acquire information such as the MAC address of the discovered peer device, the network name (i.e., the SSID), the device name, the device type, the service protocol, the service type and the like. The controller 41 may select a peer device according to the information acquired from the peer device. For example, the controller 41 may stop the periodic search operation when discovering a peer device supporting a compatible service. Also, the controller 41 may stop the periodic search operation when discovering a peer device having the same manufacture ID. Furthermore, the controller 41 may stop the periodic search operation when discovering a peer device having a preset MAC address.

The periodic listening operation refers to repeatedly switching between a listening state and a sleep state. A period of the listening operation is the sum of a duration of the listening state and a duration of the sleep state. The controller 41 may permit a user to set each of the durations of the listening state and the sleep state. However, the present invention is not limited thereto, and the durations of the listening state and the sleep state may be predetermined or may be set by a similar and suitable process. Through the listening operation, the controller 41 allows for the WiFi P2P device to be discovered by a peer device.

As indicated by reference numeral 603 of FIG. 6, the first P2P device 610 performs a listening operation through channel 1. The second P2P device 620, being in the searching state, sends a probe request message to the first P2P device 610 through channel 1, and the first P2P device 610, being in a listening state, sends a probe response message to the second P2P device 620 through channel 1. Through this message exchange, the second P2P device 620 may detect the existence of the first P2P device 610. Accordingly, the second P2P device 620 sends a connection request message to the first P2P device 610, and the first P2P device 610 sends a connection response message to the second P2P device 620, whereby the two devices are connected with each other. That is, the listening state allows for the controller 41 to be discovered by a peer device discovered through step 503 and allows for a connection with the discovered peer device.

Furthermore, although the peer device having discovered itself does not make a request for a connection, the controller 41 maintains the periodic listening operation, which is inefficient with respect to an amount of current consumption. Therefore, in step 505, the controller 41 switches from the periodic search operation to the periodic listening operation and, in step 507, the controller 41 determines if there is a connection request from the peer device within a predetermined time interval. If it is determined, in step 507, that there is no connection request from the peer device within the predetermined time interval, then the controller 41 returns to step 501 and switches to the periodic search operation. In contrast, if it is determined, in step 507, that there is the connection request from the peer device within the predetermined time interval, then, in step 509, the controller 41 maintains the periodic listening operation. Thereafter, the controller 41 may perform a corresponding connection process with the peer device during the periodic listening operation.

Figure 7A:
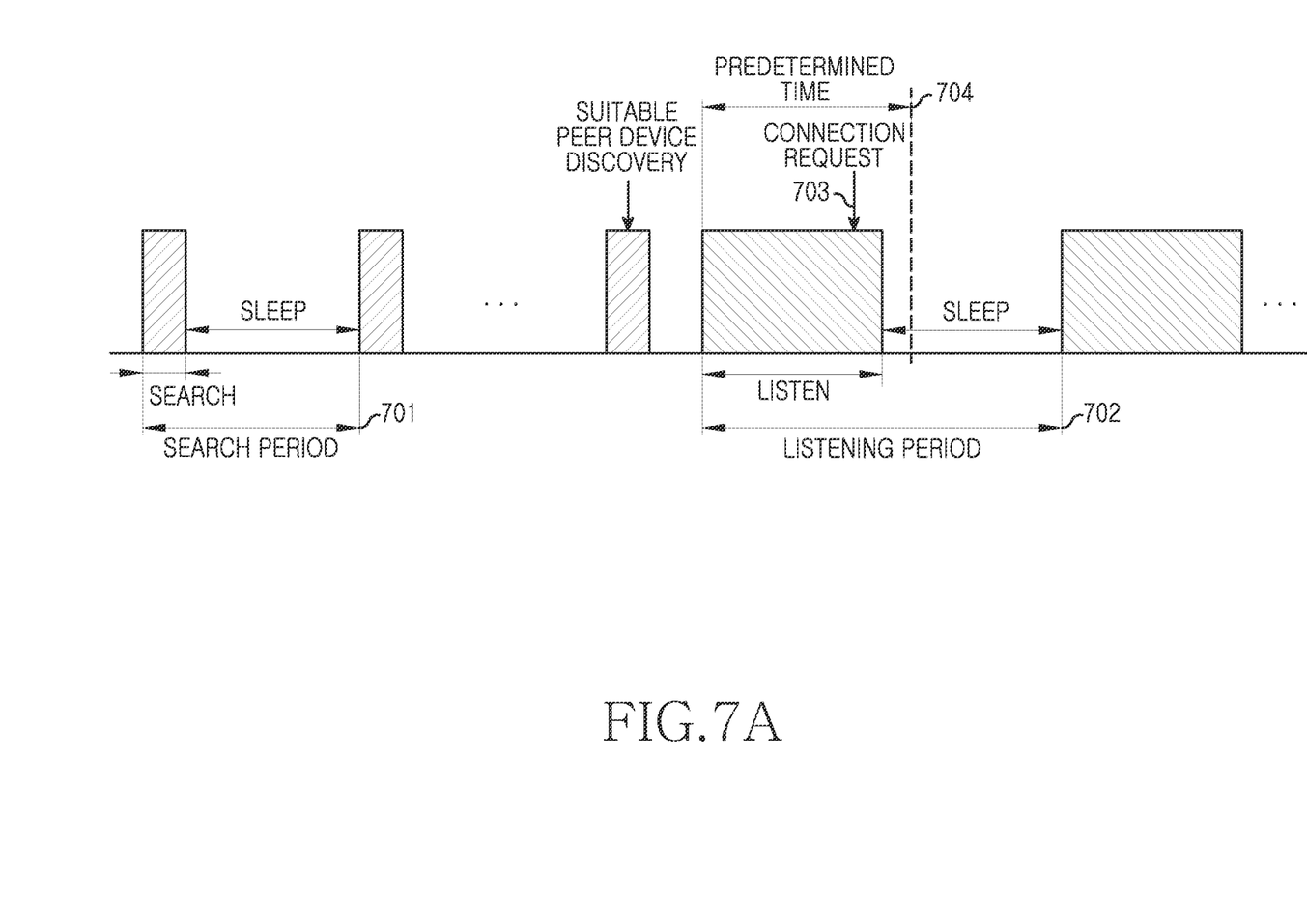
FIGS. 7A and 7B are diagrams illustrating a device discovery operation according to an exemplary embodiment of the present invention.
Figure 7B:
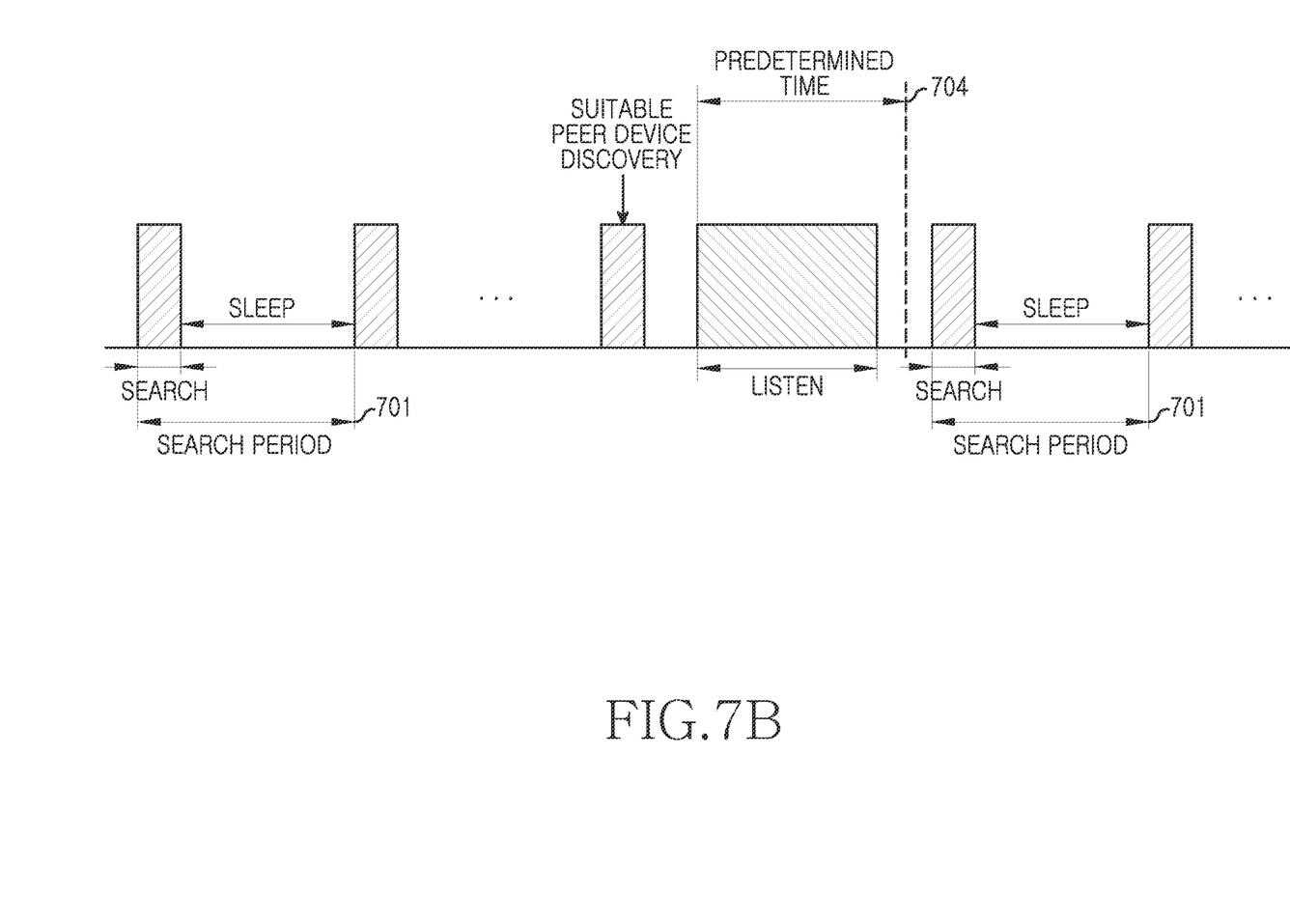

FIGS. 7A and 7B are diagrams illustrating a device discovery operation according to an exemplary embodiment of the present invention.

Referring to FIG. 7A, when discovering a suitable peer device during a periodic search operation after the search interval 701, the controller 41 stops the periodic search operation and switches to a periodic listening operation. The controller 41 begins the periodic listening operation for a duration of the listening interval 702 and, upon receiving a connection request 703 from the peer device within a predetermined time interval 704, the controller 41 maintains the periodic listening operation in order to prepare for a subsequent connection process between the two devices. In contrast, referring to FIG. 7B, the controller 41 begins the periodic listening operation and, when failing to receive a connection request from the peer device within the predetermined time interval, the controller 41 stops the periodic listening operation and converts into the periodic search operation 701.

Figure 8:
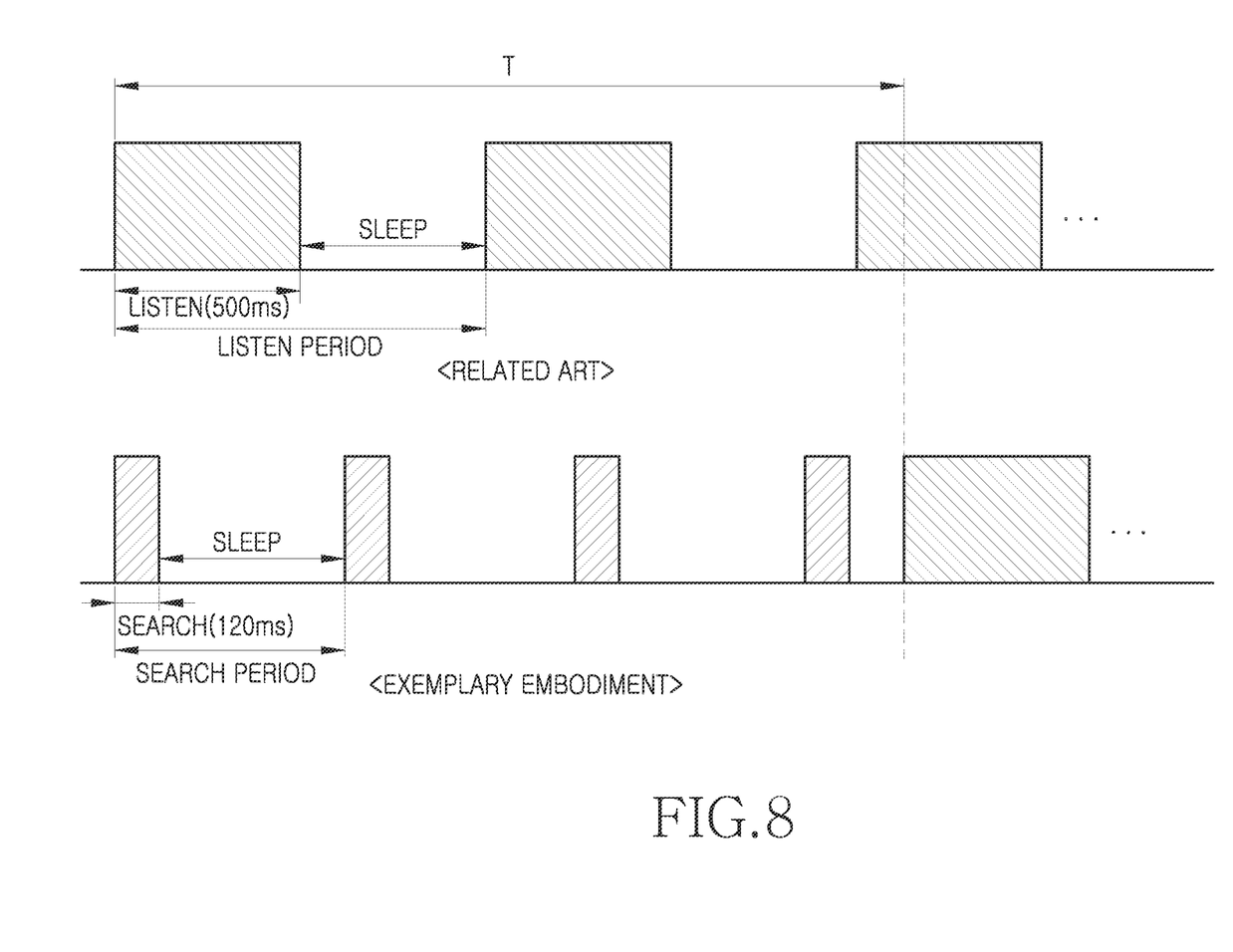
FIG. 8 is a diagram illustrating a comparison of current consumption between a related art device discovery management method and a device discovery management method according to an exemplary embodiment of the present invention.

FIG. 8 is a diagram illustrating a comparison of current consumption between a related art device discovery management method and a device discovery management method according to an exemplary embodiment of the present invention.

Referring to FIG. 8, a duration of the search operation may be 120 milliseconds (ms), a duration of the listening operation may be 500 ms, and durations of a sleep interval for both the periodic search operation and the periodic listening operation may be the same. Furthermore, as described with reference to the related art of FIG. 3, a difference between current consumed during the listening operation and the searching operation executed during the same time interval, is proportional to a difference of current consumed during respective and separate durations allotted to the listening operation and the search operation. As a result, it may be appreciated from FIG. 8 that related art current consumption is greater than current consumption of the exemplary embodiments for the same time interval (T). That is, the related art maintains only the periodic listening operation, while the exemplary embodiments perform the periodic search operation, which consumes less current than the periodic listening operation, until the discovery of a suitable peer device, thereby achieving a reduction in a total current consumed.

Program instructions to perform a method described herein, or one or more operations thereof, may be recorded, stored, or fixed in one or more non-transitory computer-readable storage media. The program instructions may be implemented by a computer. For example, the computer may cause a processor to execute the program instructions. The media may include, alone or in combination with the program instructions, data files, data structures, and the like. Examples of non-transitory computer-readable media include magnetic media, such as hard disks, floppy disks, and magnetic tape, optical media such as Compact Disk (CD) Read Only Memory (ROM) disks and Digital Versatile Disks (DVDs), magneto-optical media, such as optical disks, and hardware devices that may be specially configured to store and perform program instructions, such as ROM, Random Access Memory (RAM), flash memory, and the like. Examples of program instructions may include machine code, such as that produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more non-transitory computer readable recording mediums. Also, functional programs, codes, and code segments for accomplishing the exemplary embodiments disclosed herein may be easily construed by programmers skilled in the art to which the exemplary embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

In conclusion, a related art scheme of maintaining a listening operation, despite being in a situation of not having knowledge of when a peer device will begin device discovery, is inefficient with respect to an amount of current consumed. In contrast, when discovering a peer device that is executing device discovery, a device discovery management method and apparatus according to the present exemplary embodiments switches to a listening operation, thereby allowing for a reduction in current consumed, as compared to the related art.

It will be appreciated that embodiments of the present invention according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of managing device discovery by a Wireless Fidelity (WiFi) Peer-to-Peer (P2P) device in a wireless system, the method comprising:
   repeating a search state periodically without a listen state;
   receiving information from a peer device in the search state;
   determining whether the received information corresponds to predefined information; and
   responsive to the determination that the received information corresponds to the predefined information, repeating the listen state periodically without the search state.

2. The method of claim 1, further comprising, upon receiving a connection request from the peer device within a predetermined time period after initiating the periodic repetition of the listen state, maintaining the periodic repetition of the listen state.

3. The method of claim 1, further comprising:
   upon not receiving a connection request from the peer device within a predetermined time period after initiating the periodic repetition of the listen state, stopping the periodic repetition of the listen state, and
   repeating the search state periodically without the listen state.

4. The method of claim 1, wherein the predefined information includes information about a service compatible with the WiFi P2P device.

5. The method of claim 1, wherein the predefined information includes a same manufacturer IDentifier (ID) as the WiFi P2P device.

6. The method of claim 1, wherein the predefined information includes a Media Access Control (MAC) address.

7. The method of claim 1, further comprising setting a cycle for the periodic repetition of one of the search state and the periodic repetition of the listen state.

8. The method of claim 1, further comprising setting a cycle for the periodic repetition of the search state to be smaller than a cycle for the periodic repetition of the listen state.

9. The method of claim 1, wherein the wireless system is a Wireless Fidelity (WiFi) direct system.

10. An apparatus comprising:
    a communication unit configured to perform, under a control of a controller, device discovery in a wireless system and to wirelessly connect to a peer device; and
    the controller configured to:
      repeat a search state periodically without a listen state;
      receive information from a peer device in the search state;
      determine whether the received information corresponds to predefined information; and
      responsive to the determination that the received information corresponds to the predefined information, repeat the listen state periodically without the search state.

11. The apparatus of claim 10, wherein the controller is configured to:
    upon receiving a connection request from the peer device within a predetermined time period after initiating the periodic repetition of the listen state, maintain the periodic repetition of the listen state.

12. The apparatus of claim 10, wherein the controller is configured to:
    upon not receiving a connection request from the peer device within a predetermined time period after initiating the periodic repetition of the listen state, stop the periodic repetition of the listen state, and
    repeat the search state periodically without the listen state.

13. The apparatus of claim 10, wherein the predefined information includes information about a service compatible with the apparatus.

14. The apparatus of claim 10, wherein the predefined information includes a same manufacturer IDentifier (ID) as the apparatus.

15. The apparatus of claim 10, wherein the predefined information includes a Media Access Control (MAC) address.

16. The apparatus of claim 10, wherein the controller is configured to set a cycle for the periodic repetition of one of the search state and the periodic repetition of the listen state.

17. The apparatus of claim 10, wherein the controller is configured to set a cycle for the periodic repetition of the search state to be smaller than a cycle for the periodic repetition of the listen state.

18. The apparatus of claim 10, wherein the wireless system a Wireless Fidelity (WiFi) direct system.

* * * * *